United States Patent [19]

Chumbley

[11] Patent Number: 4,635,410
[45] Date of Patent: Jan. 13, 1987

[54] DECORATIVE FABRIC WALL SYSTEM

[76] Inventor: James F. Chumbley, 16018 Inglewood Rd., Bothell, Wash. 98011

[21] Appl. No.: 723,969

[22] Filed: Apr. 17, 1985

[51] Int. Cl.⁴ .................... A47H 23/00; E04B 1/00
[52] U.S. Cl. ........................................ 52/63; 52/273; 52/DIG. 4; 160/378; 403/401
[58] Field of Search .......... 52/63, 36, 238.1, 240-243, 52/273, 404, 144, 145, 474, 475, 476, 506, 511, 764, DIG. 4; 160/378, 369, DIG. 16; 403/401, 402, 291, 295

[56] References Cited

U.S. PATENT DOCUMENTS

| | | | |
|---|---|---|---|
| 2,860,176 | 11/1958 | Lingren | 52/273 X |
| 3,049,197 | 8/1962 | Ludwig | 52/239 X |
| 3,079,651 | 3/1963 | Hagmann et al. | 403/401 X |
| 3,112,163 | 11/1963 | Alderfer | 52/DIG. 4 |
| 3,126,332 | 3/1964 | Salete | 160/378 |
| 3,269,455 | 8/1966 | Gillotti | 160/369 |
| 3,805,872 | 4/1974 | Lorber | 52/DIG. 4 |
| 3,848,380 | 11/1974 | Assael | 52/273 X |
| 3,949,827 | 4/1976 | Witherspoon | 52/239 X |
| 4,018,260 | 4/1977 | Baslow | 52/273 X |
| 4,058,946 | 11/1977 | Habrant | 52/273 |
| 4,179,830 | 12/1979 | Lamb | 160/378 |
| 4,197,686 | 4/1980 | Baslow | 52/273 |
| 4,215,765 | 8/1980 | Harris | 52/144 X |
| 4,391,073 | 7/1983 | Mollenkopf et al. | 52/239 X |

FOREIGN PATENT DOCUMENTS

| | | | |
|---|---|---|---|
| 273691 | 11/1964 | Australia | 160/369 |
| 816971 | 7/1969 | Canada | 403/402 |

Primary Examiner—J. Karl Bell
Attorney, Agent, or Firm—John C. Hammar

[57] ABSTRACT

A decorative fabric wall system includes a connecting frame adhesively attached to wall to define an area to be covered and a corresponding stretcher frame of rigid magnetic frame members for magnetically connecting the fabric to the wall-mounted frame. The fabric is adhered to the fabric frame on an adhesive layer over the magnetic strip, and, thereby, covers and conceals the frame. The fabric is sandwiched between the corresponding magnets of the wall and fabric frame members, stretched taut across the predetermined area defined by the frames. A bonded polyester batting insulation with at least one vacuum deposited, aluminized plastic surface to form a vapor/reflective layer is placed within the margin of the framework, and is supported by the fabric.

25 Claims, 5 Drawing Figures

DECORATIVE FABRIC WALL SYSTEM

TECHNICAL FIELD

The present invention relates to fabric wall coverings, and, more particularly, to magnetic connection of fabrics to walls, which provides a decorative and insulative wall covering.

BACKGROUND ART

Professionally installed fabric or upholstery wall coverings, such as the FABRITRAK system, are receiving the attention of many interior designers and homeowners as an alternative to wall paper or paint. These systems facilitate installation of variety of textures, colors, patterns, and styles of fabrics. The fabrics can be installed over clean or marred wall surfaces without regard to their condition. The system is flexible, although the cost is a primary disadvantage to the homeowner. The FABRITRAK system uses a unique wall-mounted locking channel. A professional installer can stretch a fabric over the framework of FABRITRAK channels, and can lock the fabric in place to conceal the channels. The resulting wall exhibits acoustical advantages and improved energy efficiency. Unfortunately, such systems are quite expensive for retrofit application, because the channels must be installed accurately by a professional. The locking channels are expensive to manufacture, and the labor involved with installation makes the FABRITRAK system quite expensive. An affordable system for easy retrofit for the homeowner -"do-it-yourselfers"-, which is quick and easy to understand and to install, remains a goal of the fabric wall industry.

SUMMARY OF THE INVENTION

A decorative fabric wall system for installation by the untrained homeowner in retrofit applications includes a magnetic framework which is assembled and adhered to the wall to define the margin of the covered portion of the wall. The fabric is stretched over a corresponding magnetic or ferrometalic frame and is held in place with an adhesive or another suitable means. The two frames magnetically interconnect to provide the fabric covered wall without exposure of the frame. Even the unskilled can install the system within minutes at home, thereby greatly reducing the costs involved with the professionally installed systems. Usually, insulation (having an integral vapor/reflective barrier) will be installed between the fabric and the wall to enhance the soft wall appearance and to increase the insulative effect.

BEST MODE CONTEMPLATED FOR CARRYING OUT THE INVENTION

The decorative fabric wall system of the present invention is a simple and inexpensive way to redecorate any room to provide a lively and warm alternative to paint or wallpaper. The system is quick and easy, without mess, and can be installed on nearly any wall without consideration for the condition or appearance of the wall, since the system will create a space between the wall and the fabric which is usually filled with insulation that conceals any imperfections in the wall surface. A decorative fabric can be used as a design feature without unsightly seams or exposed frames. The system is much simpler to install than wallpaper for the average "do-it-yourselfer," and provides limitless opportunities to the designer. The insulation reduces heat loss and increases energy efficiency in a strikingly beuatiful way.

Figure 1:
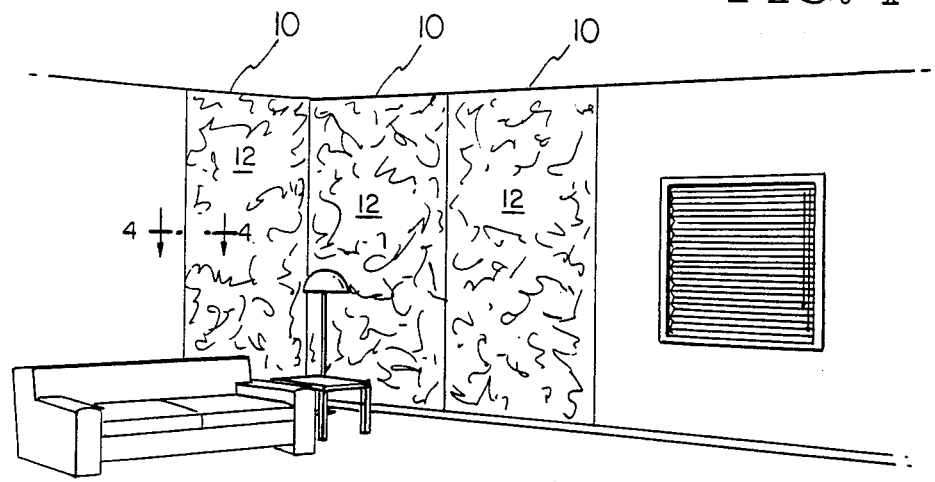
FIG. 1 is an environmental view, showing fabric wall panels of the present invention installed in a living room.
Figure 2:
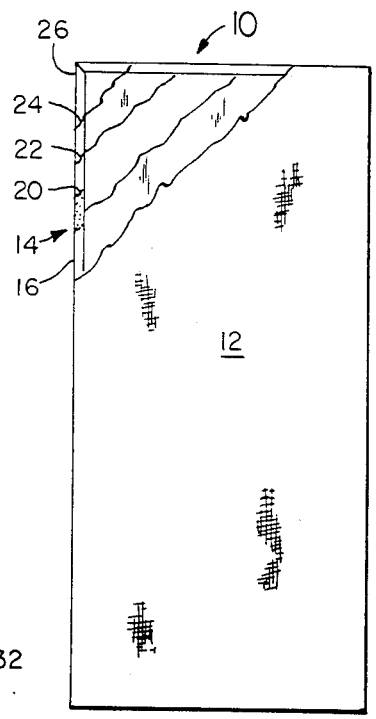
FIG. 2 is an elevational view of one fabric wall panel of the present invention.
Figure 4:
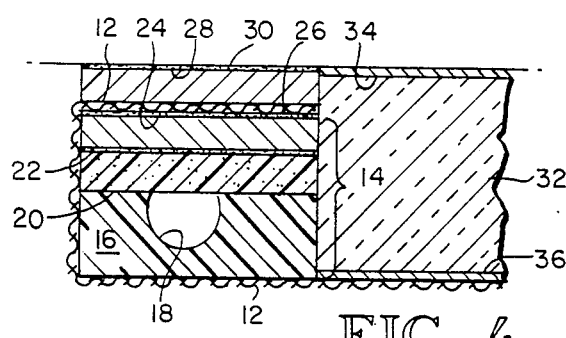
FIG. 4 is a partial sectional view of a typical fabric wall system of the present invention, taken generally along line 4—4 of FIG. 1.

As shown in FIG. 1, the panels 10 extend from floor to ceiling in large rectangular areas much like sheets of plywood or other paneling. Of course, other shapes can be used, if desired, as will be obvious to those of ordinary skill based upon the ensuing description. Each panel 10 includes a sheet of any decorative fabric 12 stretched over a fabric-holding frame 14 that defines the margin of the area to be covered. As shown in FIG. 4, the fabric-holding frame member 14 preferably includes a plurality of frame segments, including a rigid plastic body 16 extruded to include an internal channel 18 for receiving a pin or elbow 38 to interconnect adjacent segments of the frame members into the composite frame. A layer of foam 20 on the body separates the body from a double sided adhesive strip 22 that binds a magnetic or ferrometallic strip 24 to the foam 20. A second layer 26 of double sided adhesive overlies the magnetic or ferrometalic strip 24 to complete the fabric-holding frame member 14. As shown in FIG. 4, the fabric 12, which is stretched over the frame members 14, covers and conceals the frame entirely, and is held in place in part by the adhesive layer 26 atop the magnetic or ferrometalic strip 24.

The fabric 12 and fabric-holding frame are held to the wall with a magnetic connection made possible with a corresponding wall-mounted frame that includes a magnetic or ferrometalic strip 28 (FIG. 4) adhered to one side of a double sided adhesive layer 30, which is also used to adhere the strip to the wall.

To provide a soft wall appearance, to provide enhanced soundproofing, to improve the insulative factor of the wall system, and to hold the fabric taut in the frame, a layer of bonded polyester batting insulation 32, having a thickness slightly greater than the thickness of the wall and fabric frame members, is positioned behind the fabric and adjacent the wall. If used on an exterior wall, this batting should include at least one vacuum metalized film on one face of the insulation 32, and, preferably, a layer of aluminized plastic, such as MYLAR polyester, on both faces, as shown by numerals 34 and 36 of FIG. 4. These MYLAR layers make the insulation reversible to make proper installation of the insulation foolproof, and provide a vapor/reflective barrier to further enhance the insulative effects of the wall system. Although primarily designed aesthetically as an alternative to paint or wallpaper, the fabric wall system of the present invention can provide acoustical and insulative value at relatively low costs.

Figure 3:
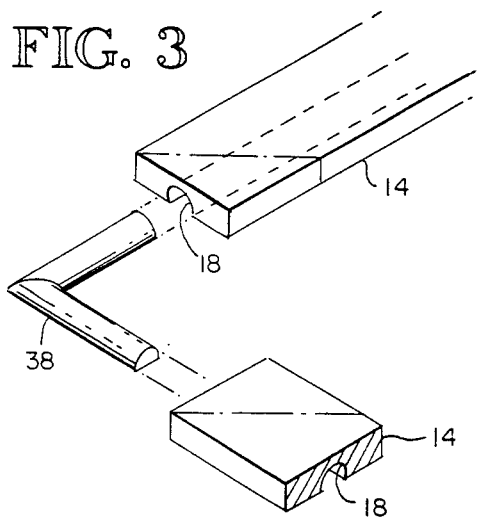
FIG. 3 is a detail of the interconection of adjacent frame members with an elbow or pin.

Even the unskilled and unfamiliar can install the fabric wall system of the present invention after only a few minutes of preparation. A fabric wall system kit comes with lengths of wall members and fabric-holding members that can be cut to size to create the necessary frames. Both the wall and fabric-holding members can be cut together with mitered corners to ensure that the frames will be congruent and of substantially identical area so that the magnetic connection will be sound about the entire margin of the frames. The elbows or pins 38 (FIG. 3), which are usually cylindrical and which are usually made from round wire, can be inserted into the channels 18 on adjacent lengths of the fabric-holding frame members to create the rigid stretcher frame. With the fabric laid flat on the floor so that the margin of fabric extends outwardly from the edges of the frame, the cover paper on the adhesive layer 26 can be stripped from the frame, and the fabric can be adhered to this surface. Then, with the wall frame members adhered to the wall, the fabric can be positioned so that the magnetic strips align and attract one another. When raising the fabric and frame, the insulation can be laid on the fabric so that it will fill the predetermined area to be covered. The fabric-holding frame can be used as a guide for cutting the insulation to the proper size. Once erected, the magnetic strips on the wall and fabric-holding frame members will also aid to help hold the fabric securely.

Although the frames have been described as essentially identical, it may be possible to use a less complete frame on the wall, since the magetic interconnection afforded with commercially available magnetic strips are quite strong. The margin of the wall frame, accordingly, may have gaps rather than being a complete framework of interconnected segments.

Preferably the bodies of the frame members are extruded plastic which will allow quick and inexpensive manufacture, simplicity of assembly, and a non-corrosive, durable member. Other materials can be used, especially wood. The bodies should be rigid and strong, but should be easily cut to length with ordinary house tools like a handsaw or pruning shears.

Figure 5:
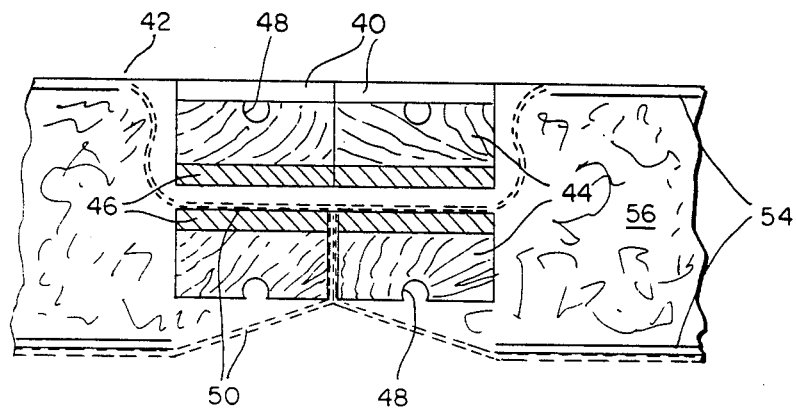
FIG. 5 is another partial sectional view, similar to FIG. 4, showing the preferred arrangement of the wall and fabric frame members.

As shown in FIG. 5, the wall member generally includes an adhesive layer 40 attached to the wall 42 and to the core or body 44 of the member. The magnetic or ferrometalic strip 46 is attached to the other surface of the body 44. A round channel 48 is fabricated into one surface of the body 44 during extrusion of the member. The frame member is of similar construction, except that it is devoid of the adhesive layer. That is, the frame member includes only the magnetic or ferrometalic strip 46 and body 44. The fabric 50 is held tightly by the magnetic attraction between the strips, and does not require further adhesive. Note that the insulation 52 has inner and outer aluminized sheets 54 on opposite faces of the batting 56. The batting is slighly thicker than the combined thickness of the frame members and fabric.

While preferred embodiments have been shown and described, those skilled in the art will recognize variations, modifications, and alterations which might be made to the elements of the fabric wall system that is described without departing from the inventive concept of a simple and inexpensive fabric wall assembly kit for the "do-it-yourselfer." Therefore, the claims should be construed broadly and liberally in light of the description, and should not be limited to the particular embodiments shown, unless such limitation is necessary in view of the pertinent prior. The claims should be construed liberally to encompass all the equivalents that are known to those of ordinary skill.

I claim:
1. A decorative fabric wall system, comprising:
  (a) a plurality of wall frame members for defining the margin of a predetermined area to be covered by fabric, each member including an adhesive layer on one face, and a magnetic or ferrometalic strip on the other face, the members being interconnectible to define the frame;
  (b) a plurality of complementary fabric holding frame members interconnectible to form a stretcher frame for holding the fabric, each member including a ferrometalic or magnetic strip on a rigid body such that the fabric members and the wall members may be magnetically adhered together;
  (c) a decorative fabric of an area slightly larger than the predetermined area so that a margin of the fabric can extend around the fabric holding frame members to fully conceal the frame members; and
  (d) means for adhering the fabric to the fabric holding frame members with the frame concealed.
2. The system of claim 1 further comprising insulation within the predetermined area behind the fabric to create a soft wall impression and to improve the insulation factor of the wall system.
3. The system of claim 2 wherein the insulation is bonded polyester.
4. The system of claim 2 wherein the insulation includes at least one aluminized plastic surface on one face of the insulation to serve as a vapor/reflective barrier.
5. The system of claim 4 wherein the insulation includes an aluminized layer on both faces to make the insulation reversible and to create a vapor/reflective barrier for the wall system.
6. The system of claim 5 wherein the thickness of the insulation is slightly greater than the combined thickness of fabric and wall frame members so that the insulation tends to stretch the fabric outwardly to keep the fabric taut.
7. The system of claim 5 wherein the bodies of the fabric and wall frame members are made from extruded plastic.
8. The system of claim 5 wherein the means for adhering includes an adhesive layer over the ferrometalic or magnetic strip on one face of the member and wherein the fabric is also held between the magnetic strips on the frame members.
9. The system of claim 7 wherein the plastic body of at least each fabric holding frame member includes a channel for interconnecting the members with an elbow or pin which seats within the channels of adjacent members.
10. A decorative fabric wall system, comprising:
  (a) a plurality of wall frame members interconnectible for defining the margin of a predetermined area to be covered by a fabric, including a rigid extruded plastic or wood body having an internal channel for connecting the members with suitable fasteners seated within the channels of adjacent members, an adhesive layer on one face of the body for connecting each frame member to the wall, and a magnetic or ferrometalic strip on the other face for interconnecting the wall-mounted frame to a fabric holding frame;
  (b) a plurality of complementary fabric holding frame members interconnectible to form a stretcher frame for the fabric of substantially equal area to that of the wall frame members, the areas being congruent, each member including a rigid extruded plastic or wood body having an internal channel for interconnecting adjacent members with suitable pins seated in the respective channels, a ferrometalic or magnetic strip on one face of the body for magnetically connecting with the corresponding strip of the wall frame member so that the fabric holding frame is held adjacent the wall;

(c) a fabric being of slightly greater area than the predetermined area so that a margin of the fabric curls around the edge of the fabric holding frame members so that the fabric is between the wall and fabric holding frame members in the assembled system and the frame is concealed; and (d) bonded polyester batting insulation within the area and having at least one aluminized plastic layer on one face to form a vapor/reflective barrier, the insulation being slightly thicker than the combined thickness of the wall and fabric holding frame members so that the insulation stretches the fabric outwardly and tends to keep the fabric taut.

11. A method for applying a decorative fabric to a wall with hidden fasteners that are easily installed without professional assistance, comprising the steps of:

(a) assembling a plurality of wall frame members into a frame defining the margin of a predetermined area to be covered by fabric;

(b) adhering the wall frame members to the wall;

(c) assembling a plurality of fabric holding frame members into a second frame of substantially identical area and shape as the wall frame;

(d) stretching a fabric over the second frame with portions of the fabric extending around the margin of the frame to completely conceal the frame, the fabric being adhered to an adhesive layer on the second frame;

(e) filling the area on the wall defined by the wall frame members with insulation; and (f) magnetically connecting the wall frame with the second frame to sandwich the fabric between the respective frame member to connect the fabric to the wall.

12. The method of claim 11 wherein the step of step a includes mitering a length of rigid frame member into several segments which are interconnectible to define the area, and interconnecting the segments.

13. The method of claim 12 wherein assembling the stretcher frame includes mitering a rigid length of frame member into a corresponding plurality of segments, and interconnecting the segments to define the corresponding area.

14. The method of claim 13 wherein the step of magnetically connecting the frames includes aligning a magnetic strip on each segment of one frame with a corresponding magnetic or ferrometalic strip on each segment of the other frame.

15. The method of claim 13 wherein the fabric is held in part by the adhesive layer on the second frame, the adhesive layer overlying the magnetic or ferrometalic strip on each segment of the second frame.

16. A decorative fabric wall system, comprising:

(a) a plurality of wall frame members for defining the margin of a predetermined area to be covered by fabric, each member including a rigid body, an adhesive layer on one face of the body, and a magnetic or ferrometalic strip on the other face, the members being interconnectible to define a wall frame;

(b) a plurality of complementary fabric holding frame members interconnectible to form a stretcher frame for holding the fabric, each member including a ferrometalic or magnetic strip on a rigid body such that the fabric frame members and the wall frame members may be magnetically adhered together;

(c) a decorative fabric of an area at least slightly larger than the predetermined area so that a margin of the fabric can extend around the fabric frame members to conceal the fabric frame members.

17. A decorative fabric wall system, comprising:

(a) a stretcher frame for holding a fabric, the frame defining a predetermined area to be covered by the fabric and including at least one magnetic or ferrometalic strip; and (b) a fabric of at least slightly greater area than the area so that the fabric can be wrapped around the frame to conceal the frame, wherein the stretcher frame holds the fabric adjacent a wall by magnetic attraction.

18. The system of claim 17 wherein the stretcher frame includes a plurality of interconnectible frame members, each member including a magnetic or ferrometalic strip.

19. The system of claim 18 further comprising a wall frame corresponding to the stretcher frame for forming the magnetic connection, the wall frame including a plurality of magnetic or ferrometalic strips attachable to the wall to define the periphery of the predetermined area.

20. The system of claim 19 further comprising insulation within the area behind the fabric and within the periphery of the wall frame when the stretcher frame is used to support the fabric against the wall.

21. The system of claim 19 wherein each wall frame strip includes an adhesive layer for attaching the strip to the wall.

22. A kit for creating a decorative fabric-covered wall over a predetermined area, comprising:

(a) stretcher means for holding a fabric in a flat, stretched configuration corresponding to the predetermined area to be covered; and (b) means for holding the stretcher means adjacent to a wall, wherein the stretcher means and holding means interact to create a magnetic connection to hold the fabric adjacent the wall.

23. The kit of claim 22 wherein the stretcher means comprises a plurality of interconnectible members, each member including a rigid body and a magnetic or ferrometalic strip on one face of the body, and wherein the holding means comprises a plurality of segments, each segment including an adhesive layer for connecting the segment to the wall and a magnetic or ferrometalic strip for interacting with a corresponding member of the stretcher means.

24. A frame member suitable for use in installing fabric to cover a predetermined area on a wall with magnetic fasteners, consisting essentially of:

(a) a rigid body including a channel for interconnecting the body to an adjacent member with a pin or elbow; and (b) a magnetic or ferrometalic strip attached to the body on one face.

25. The frame member of claim 24 wherein the member futher includes an adhesive layer attached to the body on the face opposite the magnetic or ferrometalic strip.

* * * * *